US009835757B2

(12) United States Patent
Guo et al.

(10) Patent No.: US 9,835,757 B2
(45) Date of Patent: Dec. 5, 2017

(54) PULSED-NEUTRON TOOL METHODS AND SYSTEMS FOR MONITORING CASING CORROSION

(75) Inventors: Weijun Guo, Houston, TX (US);
Dennis Durbin, Alvin, TX (US);
Kwok-Shan Kwong, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 13 days.

(21) Appl. No.: 14/396,010

(22) PCT Filed: Apr. 23, 2012

(86) PCT No.: PCT/US2012/034687
§ 371 (c)(1),
(2), (4) Date: Oct. 21, 2014

(87) PCT Pub. No.: WO2013/162505
PCT Pub. Date: Oct. 31, 2013

(65) Prior Publication Data
US 2015/0108339 A1  Apr. 23, 2015

(51) Int. Cl.
*G01V 5/10* (2006.01)
*G01V 5/04* (2006.01)
*G01V 5/12* (2006.01)

(52) U.S. Cl.
CPC .............. *G01V 5/045* (2013.01); *G01V 5/101* (2013.01); *G01V 5/125* (2013.01)

(58) Field of Classification Search
CPC ................................ G01V 5/045; G01V 5/101
(Continued)

(56) References Cited

U.S. PATENT DOCUMENTS 3,348,052 A  10/1967  Raifsnider et al.
4,020,342 A  4/1977  Smith, Jr. et al.
(Continued)

FOREIGN PATENT DOCUMENTS

WO  WO-2013/162505  10/2013

OTHER PUBLICATIONS

PCT International Search Report and Written Opinion, dated Dec. 13, 2012, Appl No. PCT/US2012/034687, "Pulsed-Neutron Tool Methods and Systems for Monitoring Casing Corrosion", date filed Apr. 23, 2012, 12 pgs.
(Continued)

*Primary Examiner* — David Porta
*Assistant Examiner* — Abra Fein
(74) *Attorney, Agent, or Firm* — Benjamin Fite Tumey L.L.P.

(57) ABSTRACT

Casing condition is an important concern to oilfield operators. Systems and methods are disclosed herein for using neutron logging tools to measure casing condition, using windows in the gamma energy spectrum that are sensitive and insensitive to casing condition to obtain a ratio having a value that ranges between one extreme representative of completely absent casing and an opposite extreme representative of casing in good condition. The sensitive ("divergence") window may be positioned at or near 7.65 MeV, the characteristic energy of gamma rays from a neutron capture event by an iron nucleus. The insensitive ("consistency") window is preferably adjacent to the divergence window with a comparable size to the divergence window. A suitable division point between the windows may be about 6.25 MeV.

15 Claims, 3 Drawing Sheets

(58) Field of Classification Search
USPC .................................................. 250/269.6
See application file for complete search history.

(56) References Cited

U.S. PATENT DOCUMENTS

| | | | |
|---|---|---|---|
| 4,450,354 | A | 5/1984 | Smith, Jr. et al. |
| 4,459,479 | A | 7/1984 | Smith, Jr. et al. |
| 4,570,067 | A | 2/1986 | Gadeken |
| 4,624,110 | A | 11/1986 | Levites |
| 4,631,405 | A | 12/1986 | Smith, Jr. |
| 4,785,175 | A | 11/1988 | Wormald et al. |
| 5,434,408 | A | 7/1995 | Smith, Jr. et al. |
| 8,346,481 | B2 | 1/2013 | Jacobson et al. |
| 8,510,050 | B2 | 8/2013 | Truax et al. |
| 8,692,185 | B2 | 4/2014 | Guo et al. |
| 2011/0282818 | A1 | 11/2011 | Chen et al. |
| 2011/0284731 | A1 | 11/2011 | Roscoe et al. |
| 2014/0142856 | A1 | 5/2014 | Guo et al. |
| 2014/0144622 | A1 | 5/2014 | Dorffer et al. |

OTHER PUBLICATIONS

PCT International Preliminary Report on Patentability, dated Jun. 4, 2014, Appl No. PCT/US2012/034687, "Pulsed-Neutron Tool Methods and Systems for Monitoring Casing Corrosion," date filed Apr. 23, 2012, 18 pgs.

AU Examination Report No. 1, dated Nov. 26, 2014, Appl No. 2012378264, "Pulsed-Neutron Tool Methods and Systems for Monitoring Casing Corrosion," Filed Apr. 23, 2012, 3 pgs.

Smith, H. D. et al., "A multi-function compensated spectral natural gamma ray logging system," SPE 12050, presented at the 58th Annual Technical Conference and Exhibition held in San Francisco, CA, Oct. 5-8, 1983, 15 pgs.

EP Extended Search Report, dated Sep. 28, 2015, Appl No. 12875592.3, "Pulsed-Neutron Tool Methods and Systems for Monitoring Casing Corrosion" filed Apr. 23, 2012.

GCC Examination Report, dated Oct. 24, 2016, Appl No. 24005, "Pulsed-Neutron Tool Methods and Systems for Monitoring Casing Corrosion," Filed Apr. 2, 2013.

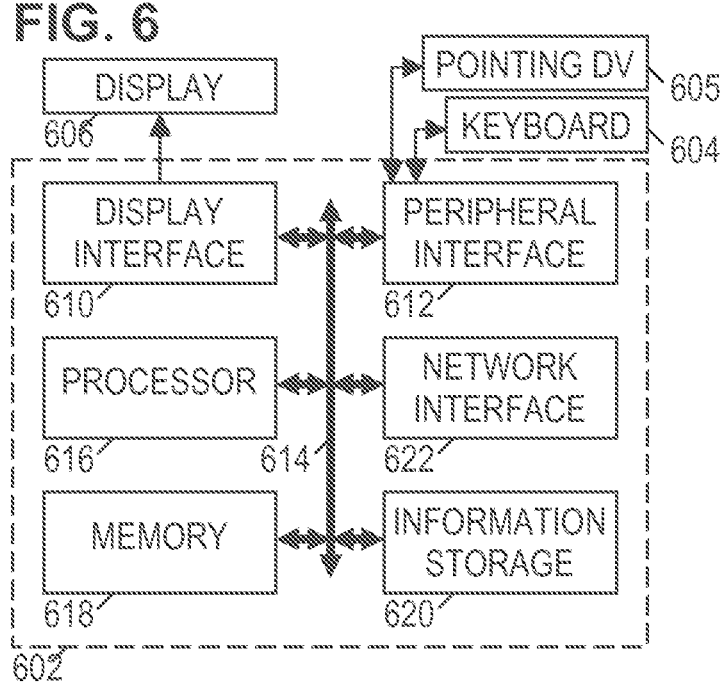

PULSED-NEUTRON TOOL METHODS AND SYSTEMS FOR MONITORING CASING CORROSION

BACKGROUND

Operators of existing wells often wish to track the evolution of the reservoir and/or to identify any previously missed opportunities for increased hydrocarbon production. Among the variety of logging tools available to operators for use in existing wells is the pulsed-neutron logging tool. This tool can provide measurements of formation porosity even from inside a cased well. It operates by generating pulses of neutron flux that radiate from the tool into the surrounding environment including the borehole and the formation. The neutrons entering the formation interact with atomic nuclei, scattering from them until they dissipate enough energy to be captured. The scattering rate (and hence the rate of energy loss) is generally dominated by the concentration of hydrogen atoms in the formation. As the presence of hydrogen is primarily attributable to the presence of water or hydrocarbon fluids, the rate of energy loss is indicative of the fluid-filled porosity of the formation.

Some tool designs derive the porosity measurement by counting the number of neutrons scattered back to the tool. Other tool designs attempt to derive a more refined measurement of the scattering and capture rates through the use of gamma ray detectors that count gamma rays emitted by the atomic nuclei after scattering and capture events. As the gamma ray energy varies based on the type of event and type of atom, the gamma ray detectors are usually configured to measure the energy associated with each counted gamma ray. Because an unexpected concentration of other elements (e.g., chlorine) can skew the measurements, the gamma ray detector measurements may be windowed to include only gamma rays having energies indicative of interactions with hydrogen nuclei and/or to exclude gamma rays having energies indicative of interactions with other elements. Still other tool designs employ a hybrid approach, using both neutron and gamma ray detectors to improve measurement accuracy.

Operators of existing wells further wish to track the condition of their wells. The well casing and any other tubular strings in the well are subject to deterioration of various kinds including corrosion. Since the well casing is not readily accessible for manual inspection, it is typically necessary to employ a casing inspection tool to determine the well's condition. Periodic maintenance inspections enable early detection of such determination and the implementation of corrective action to prevent unexpected shutdowns and improve the general overall efficiency of the operation.

Various methods are known for determining the extent of casing corrosion and otherwise monitoring the condition of the casing. As casing is generally formed of a ferromagnetic iron alloy, it can be probed with magnetic fields, eddy currents, visual inspections, and ultrasonic measurements, which can various provide measurements of resistivity, thickness, irregularities, and other indicators of defects. Generally such measurements require a logging run with a dedicated, single-purpose tool, creating an added and possibly unnecessary cost for the operator.

BRIEF DESCRIPTION OP THE DRAWINGS

Accordingly, there are disclosed in the drawings and the following description specific embodiments of pulsed neutron tool methods and systems for monitoring casing corrosion. In the drawings:

FIG. 6 is a block diagram of an illustrative data processing system.

It should be understood, however, that the specific embodiments given in drawings and detailed description thereof do not limit the disclosure. On the contrary, they provide the foundation for one of ordinary skill to discern the alternative forms, equivalents, and other modifications that are encompassed in the scope of the appended claims.

DETAILED DESCRIPTION

Figure 1:
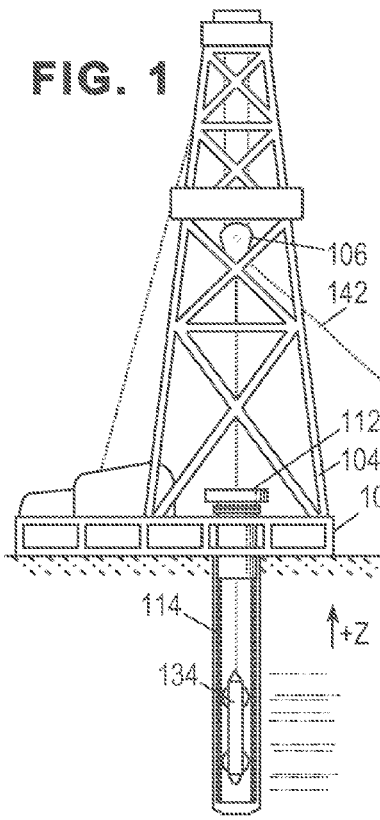
FIG. 1 shows an illustrative wireline logging environment with a pulsed-neutron logging tool.

The disclosed embodiments are best understood in the context of a suitable usage environment. Accordingly, FIG. 1 shows an illustrative wireline logging environment having a drilling platform 102 with a derrick 104 that supports a hoist with a traveling block 106 for assembling and lowering a drillstring through a wellhead 112. Below the surface, the well is shown in cross-section with a wireline sonde 134 traveling through the well casing 114. The wireline sonde 134 is suspended from traveling block 106 by a wireline cable 142, which communicates power from a logging facility 144 to the sonde and communicates telemetry from the sonde to the logging facility. The position of the wireline sonde can be monitored in a number of ways, including an inertial tracker in the sonde and a paid-out wireline length monitor in the logging facility (e.g., an idler wheel on the wireline cable). Multiple such measurements may be desirable to enable the system to compensate for varying cable tension and cable stretch doe to other factors. A data processing system 145 in the logging facility collects telemetry and position measurements and provides position-dependent logs of the sonde measurements and values that can be derived therefrom.

The wireline sonde 134 typically includes multiple instruments for measuring a variety of downhole parameters. Wheels, bow springs, fins, pads, or other centralizing mechanisms may be employed to keep the wireline sonde near the borehole axis during the logging process. The logging typically, but not necessarily, is performed as the sonde is drawn uphole at a constant rate. The parameters and instruments will vary depending on the needs of the operators, but in the present context the wireline sonde is expected to include at least a pulsed-neutron logging tool.

Figures 2A, 2B, 2C:
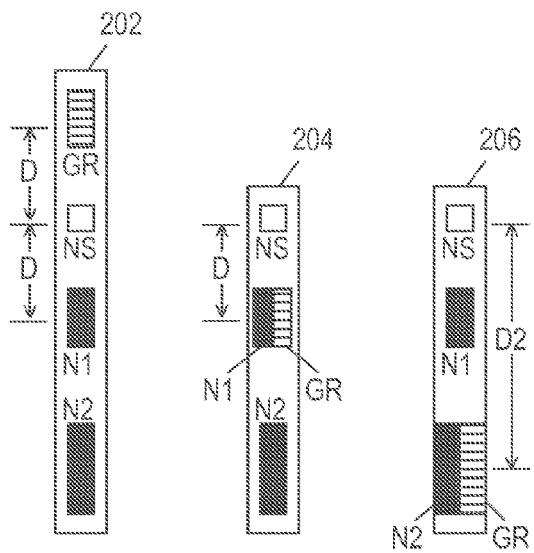
FIGS. 2A-2C are diagrams of illustrative embodiments of a pulsed-neutron logging tool.

FIG. 2A shows a first illustrative embodiment of a pulsed neutron logging tool 202 having a pulsed neutron source (NS) that is positioned equidistant from a gamma ray detector (GR) and a first neutron detector (N1). In an alternative embodiment, the pulsed neutron source can be replaced with a continuous neutron source such as Americium-Beryllium (Am—Be) chemical source. Tool 202 also includes a second neutron detector N2. The two neutron detectors N1 and N2 are sometimes respectively termed the "near" and "far" neutron detectors. The neutron detectors can be designed to count thermal (around about 0.025 eV) and/or epithermal (between about 0.1 eV and 100 eV) neutrons. Suitable neutron detectors include Helium-3 (He-3) filled proportional counters, though of course other neutron counters ears also be used. To improve tool performance, each detector can be implemented as a bank of individual detection devices. In accordance with standard neutron porosity tool measurement techniques, the ratio of far-to-near neutron detector counts is indicative of the formation porosity. See, e.g., U.S. Pat. No. 4,570,067 (Larry Gadeken); U.S. Pat. No. 4,625,110 (Harry D. Smith, Jr.); and U.S. Pat. No. 4,631,405 (Harry D. Smith, Jr.).

The gamma ray detector GR can be implemented as a scintillation crystal coupled to a photomultiplier tube. As with the neutron detector, the gamma ray detector can be implemented as a bank of individual detection devices whose results are aggregated. In FIG. 2A, the gamma ray detector is "co-distant" with the near neutron detector N1, i.e., it is positioned at the same distance D from the source NS as the near neutron detector N1. In the embodiment of FIG. 2A, the gamma ray detector GR and the neutron detector N1 are located in opposite directions from neutron source NS. FIG. 2B shows an alternative embodiment in which a neutron porosity tool 204 has a gamma ray detector GR and a near neutron detector N1 co-located, i.e., located side-by-side at the same distance D from the neutron source NS. FIG. 2C shows yet another alternative embodiment in which a neutron porosity tool 206 has a gamma ray detector GR and a far neutron detector N2 co-located at a distance D2 from the neutron source NS.

The multiple neutron detectors N1, N2 of tools 202, 204, and 206, enable the tools to measure formation porosity using any of the existing multiple-spacing techniques. In addition, the presence of a gamma ray detector GR having a common distance from the source with one of the neutron detectors, enables the measurement of casing corrosion as will be discussed further below.

Figure 3:
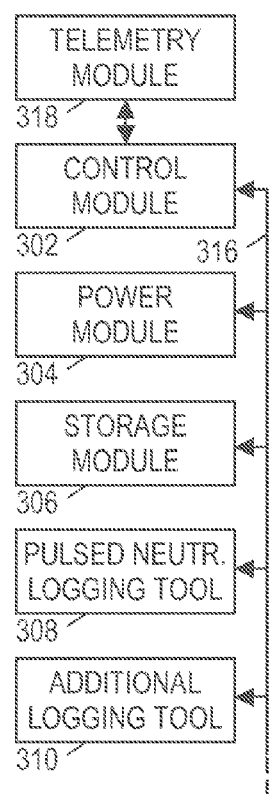
FIG. 3 is a block diagram of an illustrative wireline sonde assembly.

FIG. 3 is a block diagram of an illustrative wireline sonde assembly having a control module 302, a power module 304, an optional storage module 306, a pulsed neutron logging tool 308, and one or more additional logging tools 310. A tool bus 316 enables tire control module 302 to communicate with each of the other modules 304-314 to transfer data and control their operations. Control module 302 incorporates or couples to a telemetry module 318 to enable the control module to communicate with a data processing system 145 (FIG. 1) at the surface. The control module 302 exchanges data with data processing system 145 and receives commands for configuring the operation of the bottom hole tool assembly.

Power module 304 supplies power to the other modules. To that end, the power module 304 may include an energy storage device such as a bank of batteries, and/or capacitors. Optional storage module 306 includes memory for storing logging measurement data until it can be transmitted to the surface or until the tool is recovered and the data can be directly downloaded. Pulsed neutron logging tool 308 measures detector count rates and (for the gamma ray detector) gamma ray energies in response to the emitted neutron pulses. Other tools and sensors can also be included to measure other parameters including tool position and orientation.

Control module 302 configures the operation of the sensor modules and coordinates the transfer of tool measurement data from the sensor modules to the storage module. In addition, control module 302 sends some or all of the data to the surface for viewing and analysis during the logging process. Telemetry module 318 communicates data to the surface using any suitable wireline telemetry technique.

Figure 4:
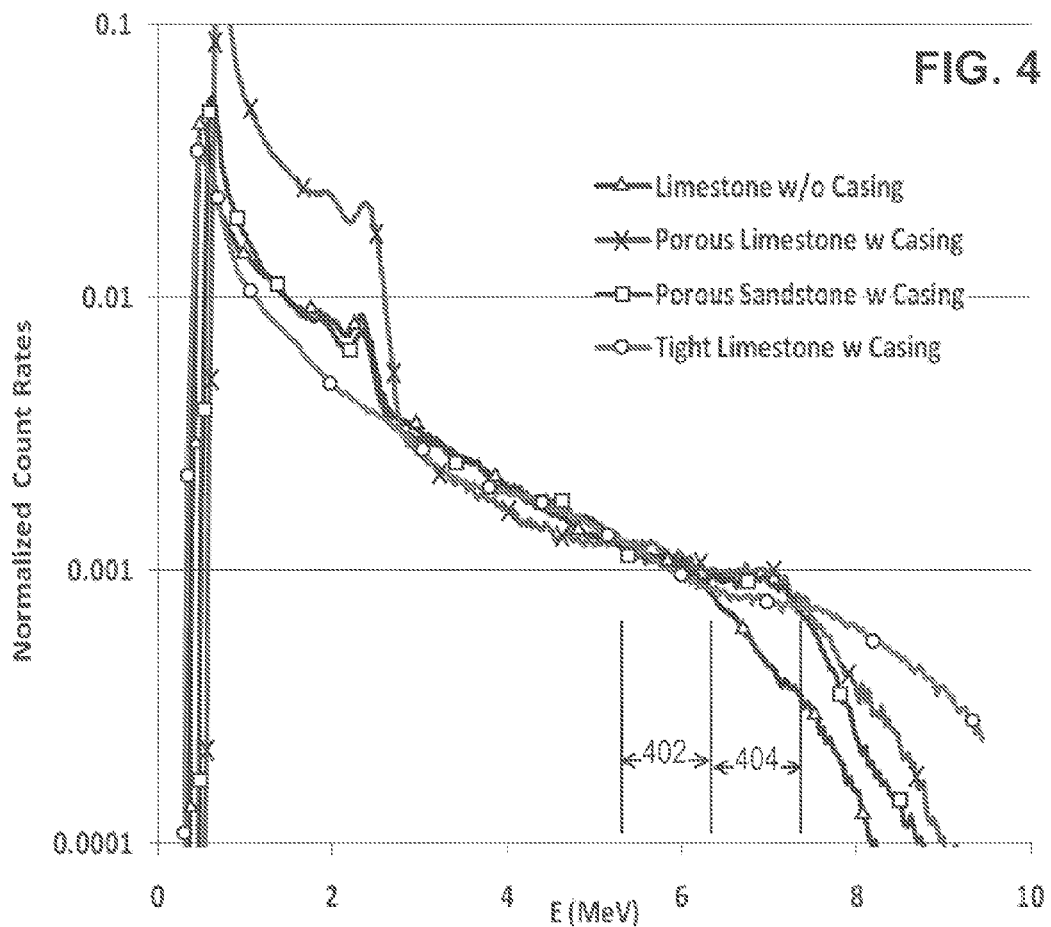
FIG. 4 is a graph illustrating a normalized gamma count rate as a function of energy and logging environment.

FIG. 4 is a graph comparing the tool's gamma ray detector measurements in four different downhole environments. In the first environment, the tool is in an uncased borehole in a limestone formation. In the other three environments, the tool is in a cased borehole in: porous limestone, porous sandstone, and tight limestone, respectively. The graph shows the normalized gamma count rate for a range of gamma ray energies between about 0.5 MeV and 9.5 MeV. (Here the normalization is provided using the count rate of the near neutron detector, but as will be made evident below, the choice of normalization strategy is not critical.) This range is useful because it includes the characteristic gamma ray values for inelastic scattering and capture events with the following common elements:

| Element | Gamma Energy (MeV) | |
| --- | --- | --- |
| | Inelastic | Capture |
| H | N/A | 2.22 |
| C | 4.4 | N/A |
| O | 3.68, 6.1 | N/A |
| Si | 1.78 | 3.54 |
| Ca | 3.73 | 2.0, 6.42 |
| Fe | 0.9, 1.3 | 7.65 |

A comparison of the measurements in the four environments indicates that there are regions of high consistency (e.g., window 402 between approximately 5.2 MeV and 6.3 MeV) and regions of high divergence for the uncased well (e.g., window 404 between approximately 6.3 MeV and 7.4 MeV). If we represent the integrated count rate in window 402 as W1 and represent the integrated count rate in window 404 as W2, we expect W1 to be insensitive to the casing condition and W2 to be sensitive to the casing condition. The absence or deterioration of the casing should be inflected in a reduced W2 value. However, the W2 value is also a function of other factors including the measurement time and the normalization method.

To provide better sensitivity to the casing condition, the ratio of W2/W1 may be taken as an indication of casing condition. In the complete absence of casing, the calculated ratio was hound to be 0.44, whereas with hilly intact casing the ratio was found to be 0.62. Though these values may vary based on borehole size, casing thickness, and presence of additional tubing strings, the values representative of an uncased borehole and a fully intact casing should be readily determinable by making a first measurement in a portion of the well known to be uncased and a second measurement near the top of the well where the casing condition can be visually inspected.

From these two extremes, it is expected that any measured W2/W1 ratio can be converted into a corrosion index (CI) ranging from, e.g., 0 (representing no corrosion) to 1 (representing complete absence of casing). In one embodiment, linear interpolation can be employed, e.g.:

$$CI=(0.62-W2/W1)/(0.62-0.44)$$

In other embodiments, a look-up table or more sophisticated function is employed to derive a corrosion index from the W2/W1 ratio.

Figure 5:
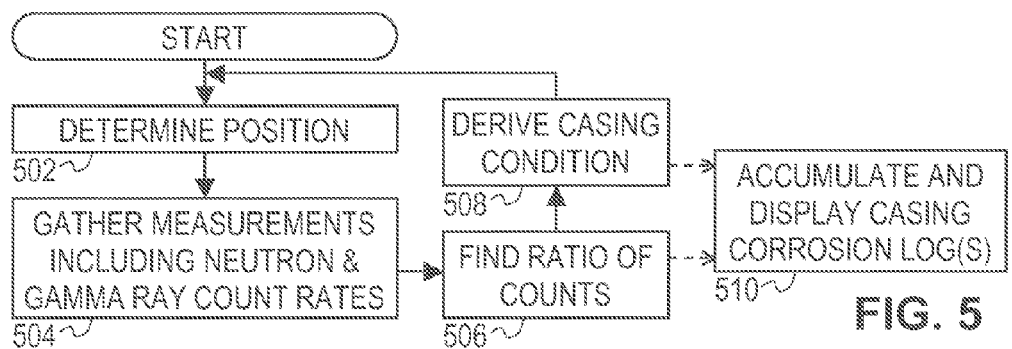
FIG. 5 is a flow diagram of an illustrative method for monitoring casing corrosion.

FIG. 5 is a flowchart of an illustrative casing condition logging method that can be carried out by the data processing system 145, the control module 302, the pulsed neutron logging tool 308, or some combination thereof. Though the measurement data originates in the tool 308 and the logs are displayed by system 50, control of the various operations described below can be concentrated in any of the foregoing components or shared between them. In the embodiment described below, control of the casing condition logging process resides with the data processing system 145.

In block 502, data processing system 145 determines the current position of the wireline logging sonde using one or more of the methods previously described. In block 504, the data processing system 145 receives logging data from the various sensors, including neutron detector count rates and gamma ray count rates and energies from the pulsed neutron logging tool. In certain contemplated tool embodiments, the He-3 neutron detectors count thermal and epithermal neutrons to determine a neutron count rate. Time windows measured relative to the neutron pulse times can be used to monitor the time evolution of the neutron count rates.

The gamma ray detector is configured to measure gamma ray energies count rates within time windows corresponding to the one(s) used for acquiring the neutron counts. The time unit for measuring count rates can be varied as desired to trade off between response time and statistical variation, but a 100 millisecond time unit should be satisfactory for most systems. If desired, the neutron detector count rates may be used to normalize the gamma count energy spectrum.

In block 506, the data processing system 145 integrates the gamma counts in two distinct energy windows, e.g., windows 402 and 404 in FIG. 4, and determines the ratio associated with the current sonde position. The W2/W1 ratio by itself can be taken as a measure of the corrosion index, or as represented by block 508 of FIG. 5, the system 145 may derive a more meaningful index value front the W2/W1 ratio. The data processing system repeats the operations represented by blocks 502-508 for each logging tool measurement. As represented by block 510, the ratio values and/or the derived corrosion index value are accumulated and displayed as function of position, yielding easing condition logs for the operator's review. Deviations from the expected index values may be diagnosed and, if necessary remedied by e.g., inserting liners for badly corroded sections. Less severe corrosion may be addressed by adjusting the operating conditions of the well to stabilize potentially problematic sections.

FIG. 6 is a block diagram of an illustrative data processing system that can be employed in real time (e.g., as system 145) or to analyze previously acquired data. The system of FIG. 6 can receive the logging data via a telemetry signal over the wireline cable, via a direct download from retrieved logging tools, or from a data file on an information storage medium. In some embodiments, a user may further interact with the system to send command to the logging tool assembly to adjust its operation in response to the received data. The system of FIG. 6 can take the form of a desktop computer that includes a chassis 602, a display 606, and one or more input devices 604, 605. Located in the chassis 602 is a display interface 610, a peripheral interface 612, a bits 614, a processor 616, a memory 618, an information storage device 620, and a network interface 622. Bus 614 interconnects the various elements of the computer and transports their communications.

In at least some embodiments, the surface telemetry data acquisition module is coupled to the processing system via the network interface 622 to enable the system to communicate with the logging tool assembly. In accordance with user input received via peripheral interface 612 and program instructions from memory 618 and/or information storage device 620, the processor processes the received telemetry information to construct casing corrosion index logs and display them to the user.

The processor 616, and hence the system as a whole, generally operates in accordance with one or more programs stored on an information storage medium (e.g., in information storage device 620). One or more of these programs configures the processing system to carry out at least one of the casing condition logging methods disclosed herein.

Numerous variations and modifications will become apparent to those skilled in the art once the above disclosure is fully appreciated. For example, the logging tools described herein can be implemented as logging while drilling tools and as wireline logging tools. The energy window(s) from which the W1 and W2 need not be continuous or adjacent—for example each count could be a weighted sum of counts from multiple windows. The use of the high-energy windows (MeV rather than KeV) provides increased depths of investigation, reducing concerns about tool off-centering and other borehole effects. It is intended that the following claims be interpreted to embrace ail such variations and modifications.

What is claimed is:

1. An iron alloy casing defect logging system that comprises:
   a logging tool having a neutron source and at least one gamma ray detector that measures a gamma ray energy spectrum having count rates associated with different gamma ray energies in a range that includes gamma rays attributable to neutron captures by iron nuclei; and
   a processing system that receives the gamma ray energy spectrum measurements and determines count rates associated with at least two energy windows, wherein the at least two energy windows include a consistency window having an associated count rate W1 centered at about 5.75 MeV that is insensitive to an iron alloy casing defect, and a divergence window having an associated count rate W2 positioned at or near 7.65 MeV that is sensitive to the iron alloy casing defect, and wherein as part of providing a log of iron alloy casing defects, the processing system determines the ratio W2/W1 as a function of the logging tool's position within the iron alloy casing.

2. The system of claim 1, wherein the processing system further displays the log to a user.

3. The system of claim 1, wherein the consistency window has a width of about 1 MeV.

4. The system of claim 3, wherein the divergence window is adjacent to the consistency window and has a width of at least 1 MeV.

5. The system of claim 1, wherein the divergence window includes at least some of the energies above 6.25 MeV.

6. The system of claim 1, wherein the processing system derives a casing corrosion index from the measured ratio value by interpolating between a ratio value associated with the absence of any iron alloy casing and a ratio value associated with an iron alloy casing without defects.

7. The system of claim 1, wherein the neutron source is a pulsed neutron source.

8. The system of claim 1, wherein the count rates are normalized.

9. A method of monitoring iron alloy casing defects, the method comprising:
   obtaining, as a function of a neutron logging tool's position along a casing, gamma ray energy spectra having count rates associated with different gamma ray energies in a range that includes gamma rays attributable to neutron captures by iron nuclei;
   processing the gamma ray energy spectra to determine, as a function of position, a ratio of count rates associated with a divergence window and a consistency window, the count rates associated with the divergence window being sensitive to an iron alloy casing defect and the count rates associated with the consistency window being insensitive to the iron alloy casing defect; and providing a log of iron alloy casing defects based at least in part on the ratio;

wherein the consistency window is centered at about 5.75 MeV and the divergence window is positioned at or near 7.65 MeV.

10. The method of claim 9, wherein the divergence window includes at least some of the energy spectra count rates above 6.25 MeV.

11. The method of claim 9, wherein the divergence and consistency windows are adjacent to each other and equally-sized.

12. The method of claim 9, wherein the log of iron alloy casing defects is derived from the measured ratio by interpolating between a ratio value associated with completely absent casing and a ratio value associated with iron alloy casing without defects.

13. The method of claim 9, further comprising:
identifying regions where the log of iron alloy casing defects indicates iron alloy casing corrosion; and
treating said regions with a corrosion inhibitor.

14. The method of claim 9, wherein said neutron logging tool is a pulsed neutron logging tool.

15. The method of claim 9, further comprising:
deriving a log of formation porosity from measurements obtained from the neutron logging tool; and
displaying the log of formation porosity and the log of iron alloy casing defects to a user.

* * * * *